United States Patent [19]

Perkins

[11] 4,205,849
[45] Jun. 3, 1980

[54] FOLDABLE STENCILS PUZZLE

[76] Inventor: John A. Perkins, 1905 Laurelwood, Kalamazoo, Mich. 49002

[21] Appl. No.: 921,331

[22] Filed: Jul. 3, 1978

[51] Int. Cl.² .................. G09B 11/04; A63F 9/08
[52] U.S. Cl. ................................ 273/155; 35/26
[58] Field of Search .................. 273/155; 35/26; 33/174 B; 229/84

[56] References Cited

U.S. PATENT DOCUMENTS

| 856,196 | 6/1907 | Lehman | 273/155 |
| 958,166 | 5/1910 | Patton | 229/84 |
| 3,354,560 | 11/1967 | Kuenzel | 35/26 |
| 3,758,695 | 9/1973 | Goodman et al. | 35/26 |

FOREIGN PATENT DOCUMENTS 566710 11/1923 France .................................. 273/155

Primary Examiner—Anton O. Oechsle
Attorney, Agent, or Firm—Gordon W. Hueschen

[57] ABSTRACT

Means is described for transferring the component parts of an unknown design to copy sheet such that the unknown design is not recognizable until it has thus been fully reproduced on the copy sheet. The particular means described is a packet comprising a central sheet having attached thereto by fold lines, a plurality of fold-in sheets adapted to overlay the central sheet, in which at least two of the fold-in sheets comprise sheet-form stencils having different component stencil designs therein which, taken together, form a composite stencil design corresponding to the unknown design. By placing a copy sheet in the pocket overlaying the central sheet and successively overlaying it with the fold-in sheet-form stencils and successively transferring the component stencil designs thereof to the copy sheet, the unknown design is thus produced.

2 Claims, 12 Drawing Figures

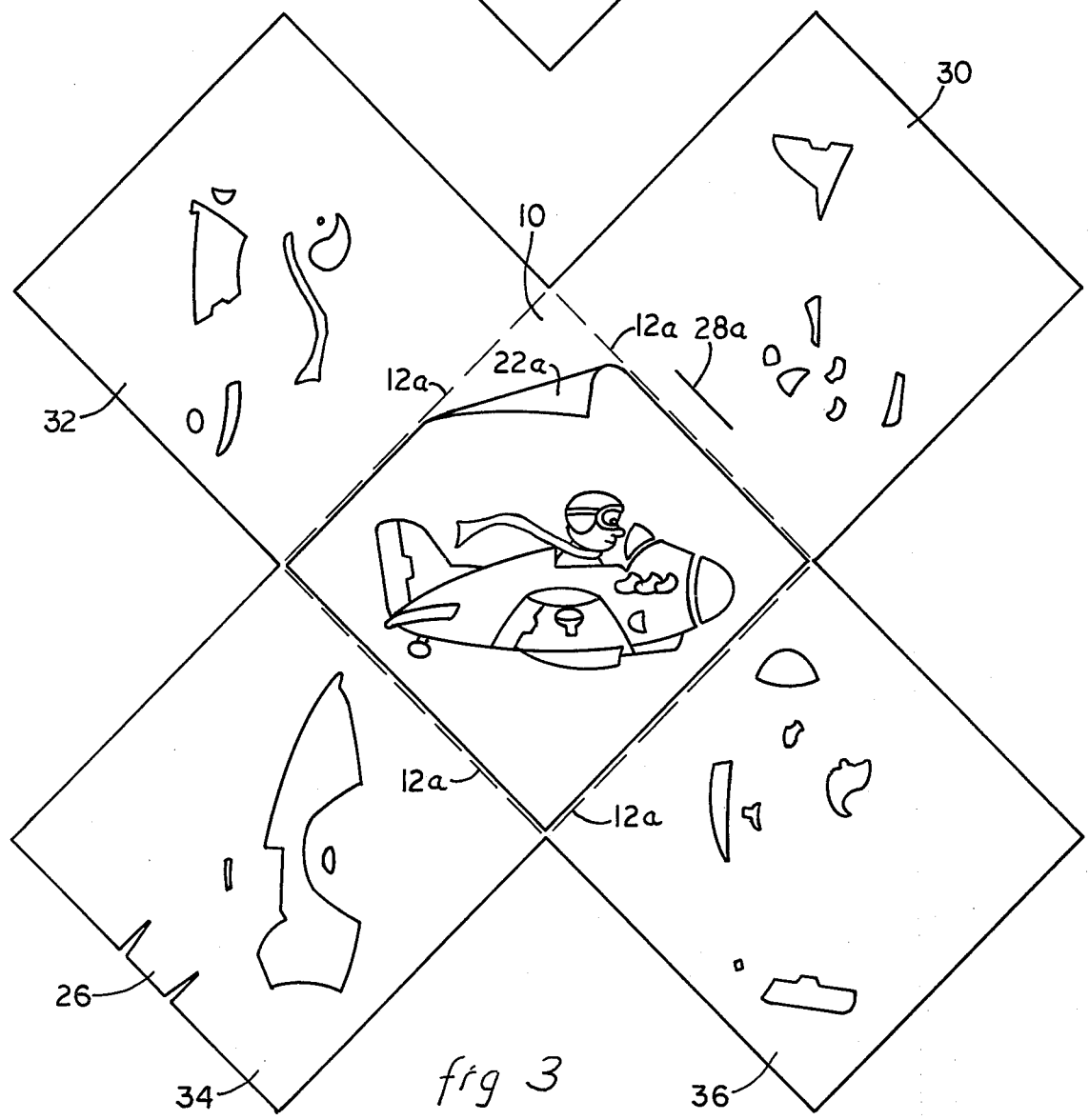

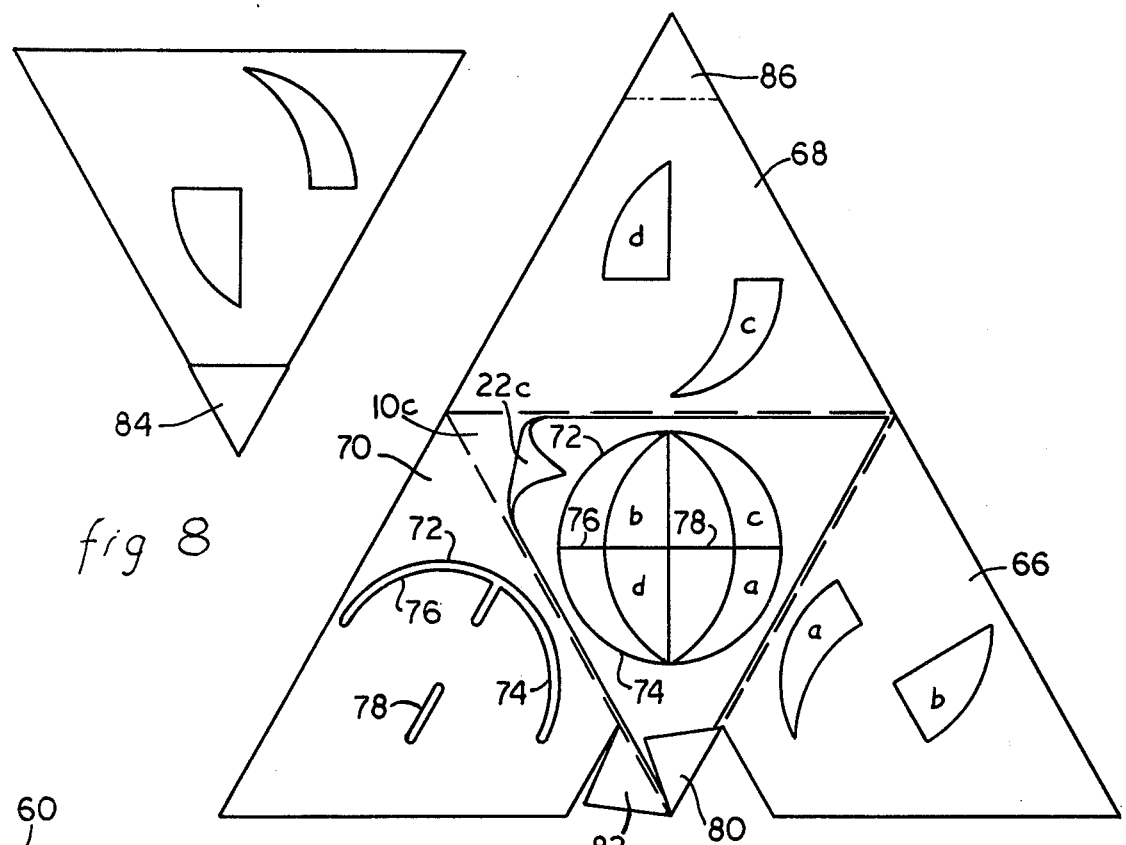
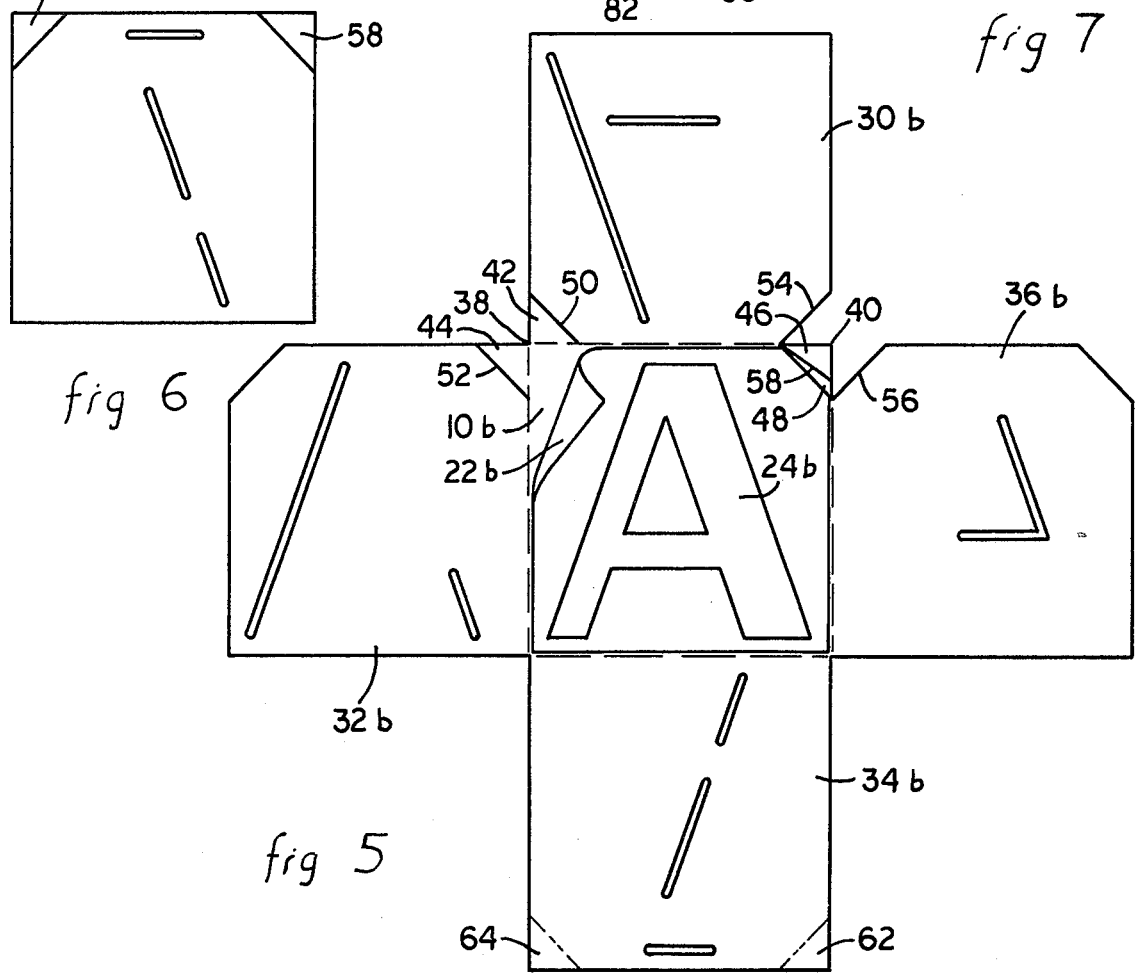

FOLDABLE STENCILS PUZZLE

FIELD OF THE INVENTION AND PRIOR ART

The invention relates to a puzzle and a process for reproducing an unknown design on a copy sheet.

Stencils having component parts of a composite design are known in the art. Such devices as have heretofore been known however, have been complicated in their design and their usefulness, particularly in regard to the handling and positioning of the component stencils.

OBJECTS OF THE INVENTION

It is an object of the invention to provide improvements in a puzzle and processes for reproducing unknown designs. It is a further object of the invention to provide a puzzle and process of the type described which is simple in structure and operation. It is a further object to provide a puzzle and process of the class described which is inexpensive to manufacture. It is a further object of the invention to provide a puzzle and process of the class described which is attractive to children. Further objects of the invention are to avoid the disadvantages of the prior art and to obtain such advantages as will appear as the description proceeds.

BRIEF DESCRIPTION OF THE INVENTION

The invention relates to a process for reproducing an unknown design on a copy sheet which comprises placing the copy sheet on a central sheet having attached thereto by fold lines, a plurality of fold-in sheets adapted to overlay the central sheet, at least two of the fold-in sheets comprising sheet-form stencils having different component stencil designs thereon which, taken together, form a composite design consisting in said unknown design, overlaying the copy sheet successively by the fold-in, sheet-form stencils and successively transferring the component stencil designs therein to the copy sheet until the unknown design is fully reproduced thereon.

The invention is also directed to the puzzle so characterized and to a puzzle packet containing a plurality of copy sheets held in place on the central sheet by the fold-in sheets.

Advantageously, the component stencil designs comprise either line-form apertures or block area cut-outs, or both. Also, it is of advantage to have the central sheet in the form of a polygon and the fold-in sheets to have the same configuration as the central sheet, especially the outermost one.

It is also of advantage to have in the outermost fold-in sheet means for holding it in position over all the other fold-in sheets in the form of a packet. Advantageously, this holding means comprises a tab in the outermost fold-in sheet and a complementary slit in the next underlying fold-in sheet. Alternatively, the holding means can comprise a corner pocket adapted to engage a corner of the outermost fold-in sheet. Advantageously, these fold-in pockets are formed by triangular tabs on each side of a corner of the central sheet which tabs are in the shape of equilateral triangles, one leg of which is a fold line and the other leg of which is an extension of the other fold line. Thus, when the triangular flaps are folded in, one will overlie the other and form a corner pocket.

When the stencils comprise block area cut-outs, these can be arranged so that they can be used for outlining the block area, shading the block area or coloring the block area. Thus, a multicolored design can be obtained or an outlined or shaded design can be obtained. It is also possible to combine with the block area cut-outs, or to use separately, line-form apertures, that is, apertures of such size that, when a pencil or crayon is used therein, individual single lines are transferred to the copy sheet.

BRIEF DESCRIPTION OF THE DRAWINGS

In the Drawings:

FIG. 3 is a plan view of another form of the invention.
FIG. 4 is a plan view of FIG. 3 folded.
FIG. 5 is a plan view of another form of the invention.
FIG. 6 is a plan view of the folded form of FIG. 5.
FIG. 7 is a plan view of another form of the invention.
FIG. 8 is a plan view of the folded form of FIG. 7.

DETAILED DESCRIPTION OF THE INVENTION

Figure 1:
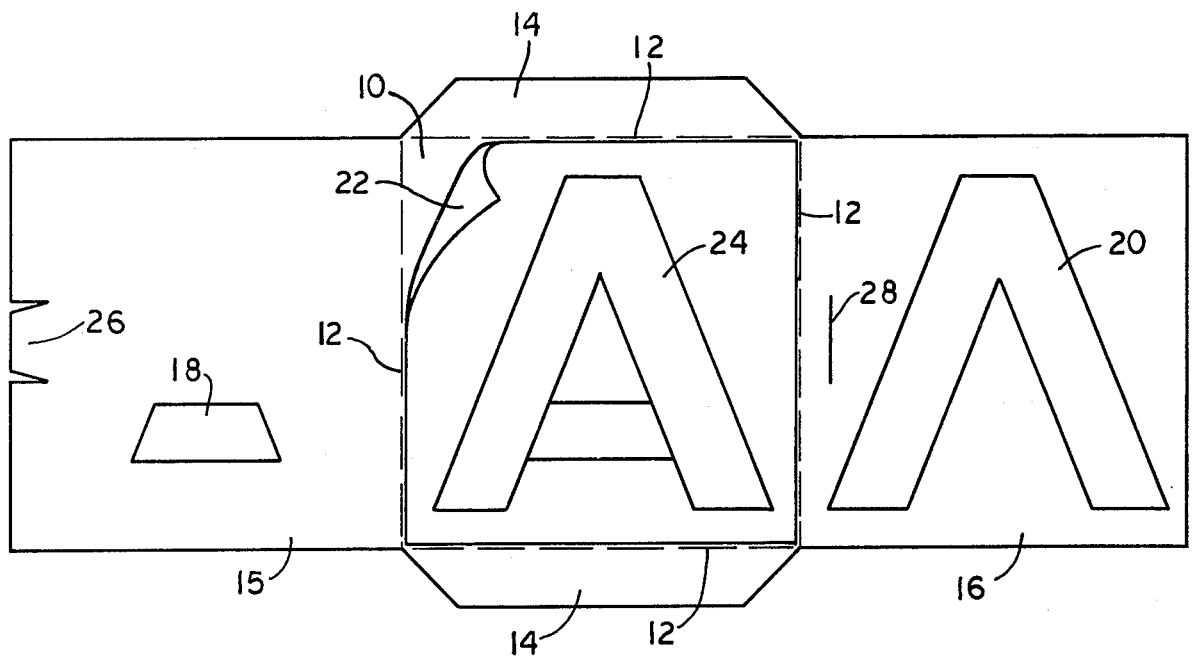
FIG. 1 is a plan view of one form of the invention.
Figure 2:
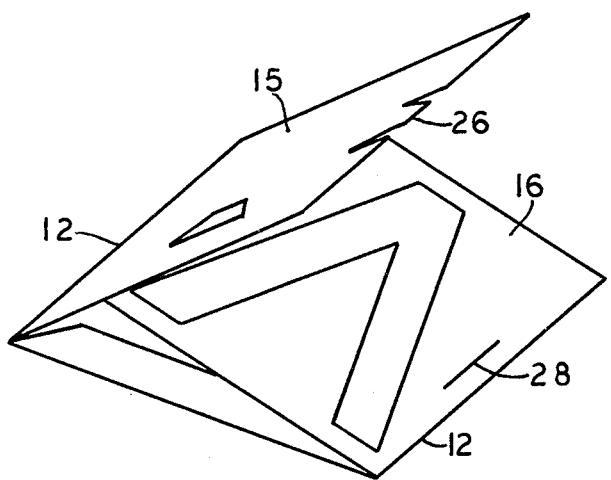
FIG. 2 is an isometric view of FIG. 1 partly folded.

In FIGS. 1 and 2 there is shown a relatively simple form of the invention in which a central sheet 10 in the shape of a square has attached thereto along fold lines 12 fold-in sheets 14, 15, and 16. Of these, fold-in sheets 15 and 16 also are in the shape of squares and are coextensive in shape and area with central sheet 10. Each of the fold-in sheets 15 and 16 have block area cut-outs 18 and 20, which are different component stencil designs which, when taken together, form a composite stencil design.

At 22 there is shown a copy sheet complementary in size and shape to central sheet 10. This copy sheet is positioned on the central sheet in alignment with the score lines 12. Then, one of the sheet-form stencils 18 or 20 is folded in and the component stencil dies thereon are transferred to the copy sheet 12. It is then folded out and the other stencil folded in and the component design thereon transferred to the copy sheet, with the result that the composite design 24 is reproduuced on the copy sheet.

The composite design can be reproduced as an outline letter by penciling along the outer edges of the block area cut-outs or, as a shaded design by shading the whole area or, as a colored area by choosing a colored pencil or crayon, water colors, or the like.

While a single "A" has been illustrated, it is to be understood that a plurality of smaller letters can be similarly reproduced on the copy sheet 22 and that, if desired, the letters can spell out a message. Thus a packet, as shown in FIGS. 1 and 2, could be made up in the form of a greeting card.

The fold-in sheets 14 are small because they do not carry a stencil design, but it is to be understood that they can be the same size and shape as the fold-in sheets 15 and 16.

As shown in FIG. 2, the outermost sheet-form stencil 15 is provided with a centrally-located tab 26 on the side remote from the fold line 12 and the underlying sheet-form stencil 16 is provided with a slit 28 which is complementary to the tab 26. The slit 28 is located near the fold line 12 and parallel thereto and is adapted to receive the tab 26 when the sheet-form stencil 15 is folded down on the sheet-form stencil 16.

In FIGS. 3 and 4 there is shown a variation in which the central sheet 10a has attached thereto by fold lines 12a, four sheet-form stencils, 30, 32, 34, and 36, each of which has different component designs of the composite design shown on the copy sheet 22a. The fold-in sheet 34 is also provided with tab 26a which is complementary to the slit 28a formed in the fold-in sheet 30 in the same manner as described in connection with FIGS. 1 and 2.

FIGS. 5 and 6 show a variation of FIG. 4, in which the fold-in sheets 30b, 32b, 34b, and 36b have only lining apertures therein, so that the resulting composite design 24b is a lined block letter. In this regard, it distinguishes from FIGS. 1 and 2, where the same block letter can be either lined, shaded, or colored solidly.

The corners 38 and 40 of the central sheet 10 have attached thereto by the score lines 12 triangular tabs 42, 44, 46, and 48. These are formed by cutting fold-in tabs 50, 52, 54, and 56, respectively. The tabs are in the shape of equilateral triangles with one leg on the fold line and the other an extension of the other fold line so that, when they are folded in, as shown at 46 and 48, the uppermost tab 46, can be glued to the undermost tab 48 to form a pocket 58. A similar pocket 60 is formed from the tabs 42 and 44. The pockets 58 and 60 are adapted to receive the corners 62 and 64 of the outermost fold-in sheet 34b to form the packet shown in FIG. 6.

In FIGS. 7 and 8 there is shown a modified form of the invention in which the central sheet 10c is seen in the form of an equilateral triangle and the fold-in sheets 66, 68, and 70 are in the form of equilateral triangles complementary to the central sheet 10c. In fold-ins 66 and 68, there are shown block area cut-outs a, b, c, and d, which are adapted to outline the areas a, b, c, and d on the copy sheet 22. On fold-in sheet 70 there are the lining apertures in which the curved parts 72 and 74 correspond to the curved parts 72 and 74 of the composite on the copy sheet 22c and the parts 76 and 78 correspond to the parts 76 and 78 thereon.

At the bottom of the central sheet 10c there is provided triangular tabs 80 and 82 cut out from the fold-in 66 and 70, essentially in the same manner as described in FIGS. 5 and 6. When tab 80 is folded in first, tab 82 is folded over it and glued thereto to form a pocket 84, which receives the corner 86 when the fold-in 68 is folded in over the fold-ins 66 and 70 to form a packet as shown in FIG. 8.

Figure 9:
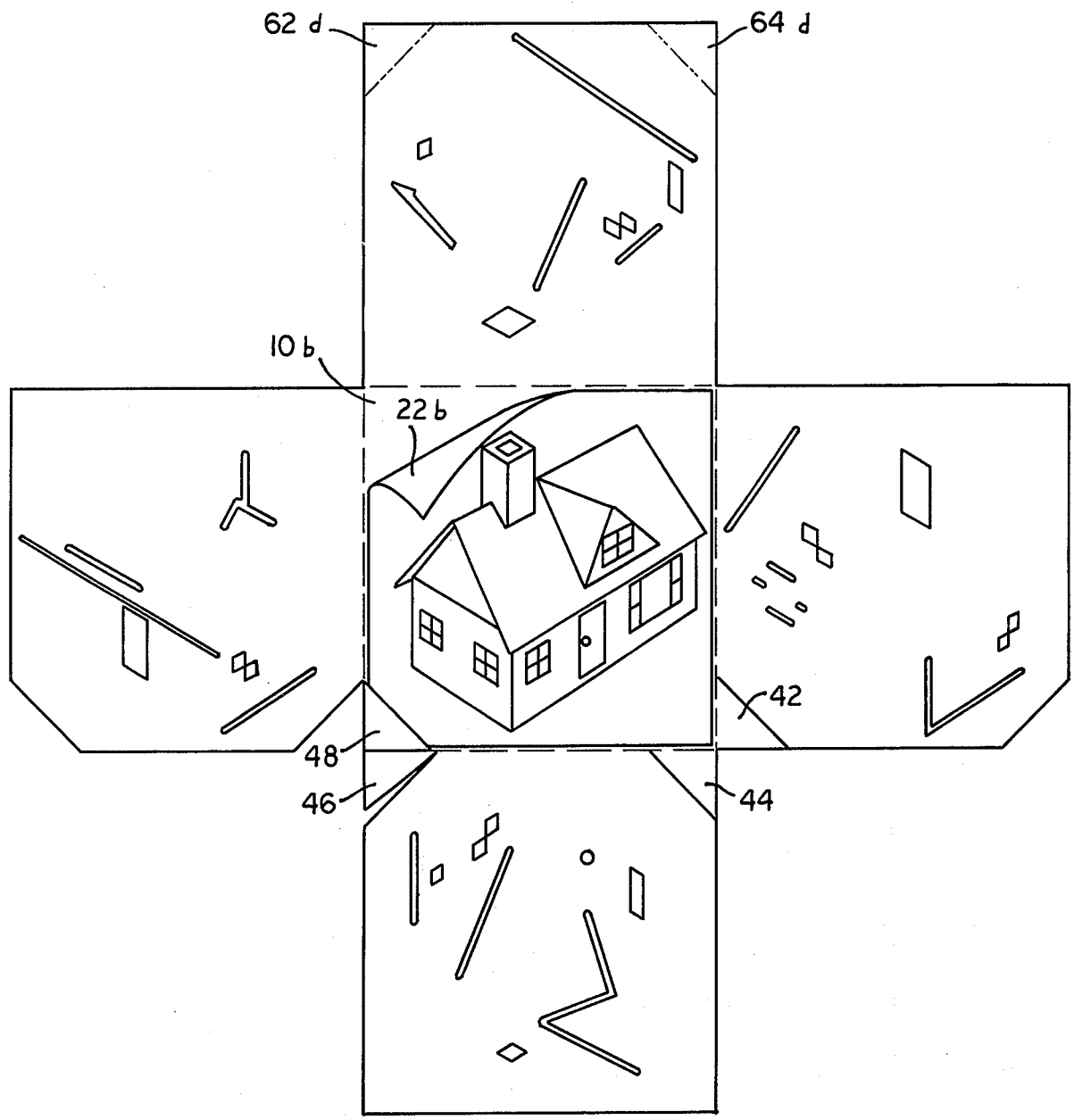
FIG. 9 is a plan view of another form of the invention.

FIG. 9 is a variation of FIGS. 5 and 6, in which like numbers refer to like parts. In this modification, the component stencils comprise line-form apertures and block area cut-outs which are intended primarily to produce the outline design shown on the copy sheet 22b.

Figures 10, 11, 12:
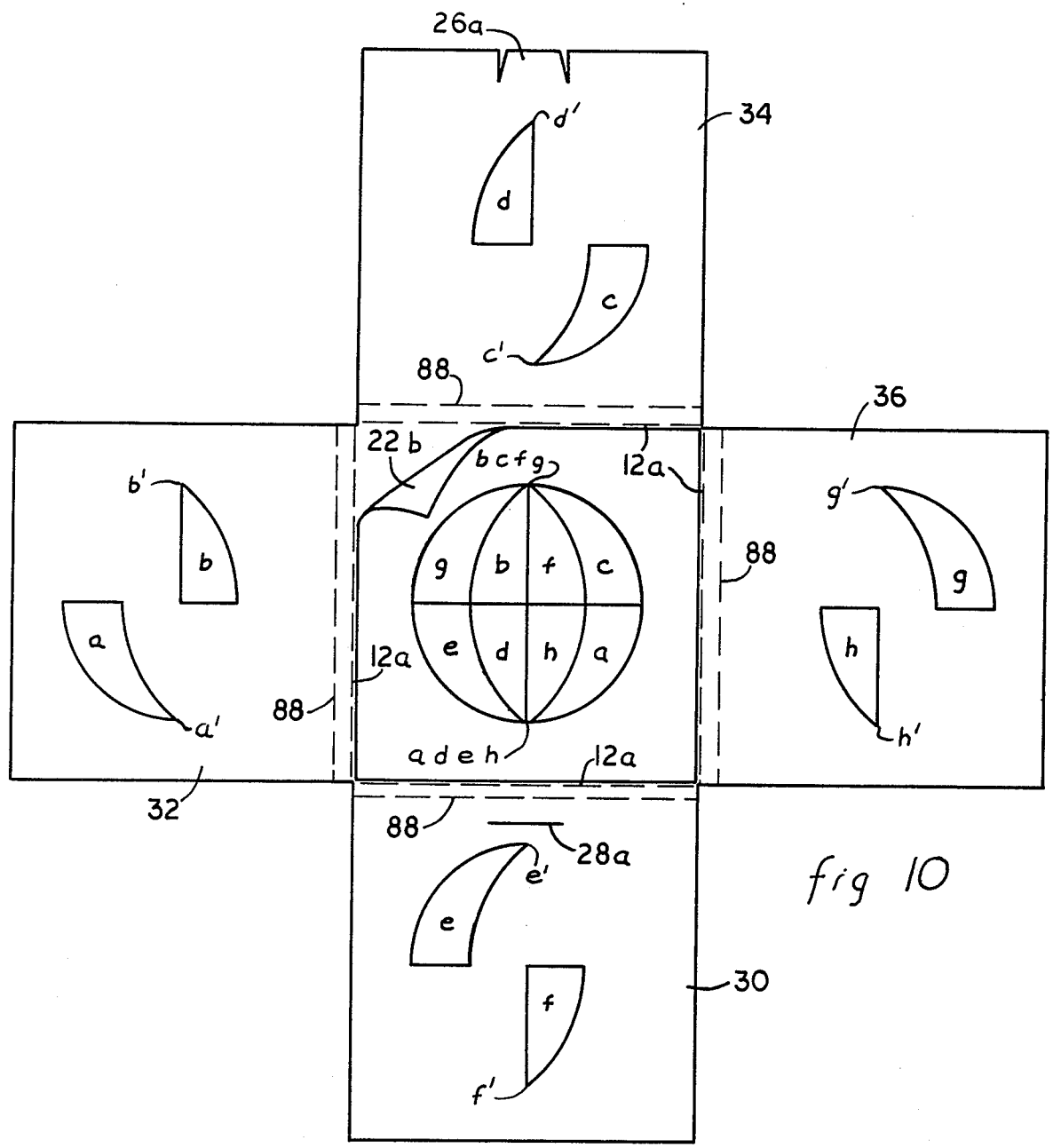
FIG. 10 is a plan view of another form of the invention.
FIG. 11 is an isometric view of FIG. 10 partly folded.
FIG. 12 is a plan view of FIG. 10 folded.

In FIGS. 10, 11, and 12 there is shown another modification of the invention, which is a variation of that shown in FIGS. 3 and 4 and in which like parts are shown by like numbers. In this modification, the composite design is essentially the same as that in FIGS. 7 and 8, but is made up of component stencils which are all block area cut-outs, so that each of the block areas a through h can be colored to provide a multicolored design. Also, in this modification there are shown fold lines 88 parallel to the fold lines 12a to provide depth to the packet, as shown in FIG. 11, in order to hold a larger number of copy sheets. It will be understood that the distance between the fold lines 88 and 12a is exaggerated for the purpose of illustration and that, in practice, the fold lines would be in close proximity or juxtaposed.

If the score lines are farther apart, as actually shown in the figure, it is desirable to have the block area cut-outs a through h symmetrically oriented with respect to the fold lines 12a. In such case, the packet of copy sheets would be taken out and one sheet put in, the fold-ins folded in along the fold lines 12a, and the copy sheet pushed up against the fold in order to assure proper orientation of the block area cut-outs in regard to the final composite design. Thus points a', b', e', and h' of the component block area cut-outs would be the same distance from the fold line 12a as points a, d, e, and h, of the composite design; points b', c', d', and f' the same distance from the fold line 12a as points b, c, d, and f of the composite design, and so on. In this manner, the fold lines 12a constitute guide lines for positioning the copy sheet 22b and any of the fold-in sheets 30, 32, 34, and 36, when folded in on the fold lines 12a, will constitute a stop against which the copy sheet can be positioned to determine accurately its orientation with respect to the block cut-out areas a through h.

It will thus be seen that there is provided by the present invention a new and useful process and puzzle for reproducing an unknown design having advantages in construction and operation not found in the prior art.

It is to be understood that the invention is not to be limited to the exact details of operation or structure shown and described, as obvious modifications and equivalents will be apparent to one skilled in the art.

I claim:

1. A puzzle comprising a central sheet having attached thereto by fold lines, a plurality of fold-in sheets adapted to overlay said central sheet, at least two of which fold-in sheets comprise sheet-form stencils having different component stencil designs therein which, taken together, form a composite stencil design, whereby a stencil design can be transferred to said central sheet or to a copy sheet placed thereon, by successively overlaying said central sheet by said fold-in, sheet-form stencils and successively transferring the component stencil design thereof to the underlying sheet, in which the central sheet is a polygon having said fold-in sheets attached to each side thereof by fold lines, at least two of which comprise said fold-in, sheet-form stencils, whereby, when all said fold-in sheets are folded in, they form with said central sheet, a pocket adapted to hold a plurality of copy sheets complementary in size and shape with said central sheet, in which the outermost said fold-in sheet has the same configuration as said central sheet, and is adapted to overlay the others and is provided with holding means for holding said puzzle in folded position, in which said holding means comprises a corner pocket adapted to receive the corner of the outermost said fold-in sheet and, in which the holding means comprises tabs in the form of equilateral triangles integral with a corner of said central sheet and having one leg thereof comprising one fold line and the other leg thereof an extension of the other fold line at the said corner whereby, when one tab is folded in on its fold line and the other tab is folded in on its fold line, the latter will overlie the former and, when glued thereto, form the desired pocket.

2. A puzzle packet comprising a central sheet having attached thereto by fold lines a plurality of fold-in sheets, one of which overlays said central sheet and each other of which overlays a fold-in sheet, and at least two of which comprise sheetform stencils having different component stencil designs therein which, taken together, form a composite stencil design, and at least one copy sheet disposed between said central sheet and the overlying fold-in sheet, whereby a stencil design can be transferred to a copy sheet by successively overlaying it with a fold-in sheet form stencil and successively transferring the component stencil design thereof thereto, in which said copy sheet is complementary in size and shape to said central sheet, whereby said fold lines form guides for the positioning of said copy sheet and the folded-in, sheet-form stencil forms a stop against which an edge of the copy sheet abuts when it is properly positioned to receive the component stencil design, in which the outermost said fold-in sheet forms a cover to hold the other fold-in sheets and the copy sheets together as a packet and is provided with holding means for holding said packet in folded position, in which said holding means comprises a corner pocket adapted to receive a corner of said outermost fold-in sheet and, in which the holding means comprises tabs in the form of equilateral triangles integral with a corner of said central sheet and having one leg thereof comprising one fold line and the other leg thereof an extension of the other fold line at the said corner whereby, when the tabs are folded in on their fold line, one will overlie the other and when glued thereto, form the desired pocket.

* * * * *

UNITED STATES PATENT AND TRADEMARK OFFICE
CERTIFICATE OF CORRECTION

PATENT NO. : 4,205,849

DATED : June 3, 1980

INVENTOR(S) : John A. Perkins

It is certified that error appears in the above-identified patent and that said Letters Patent are hereby corrected as shown below:

Col. 3, line 48; "bottom of" should read -- bottom corner of --

Signed and Sealed this

Twenty-fifth Day of November 1980

[SEAL]

Attest:

SIDNEY A. DIAMOND

Attesting Officer

Commissioner of Patents and Trademarks